United States Patent
Saito et al.

(10) Patent No.: US 11,286,399 B2
(45) Date of Patent: *Mar. 29, 2022

(54) POWDER COATING COMPOSITION, PROCESS FOR PRODUCING CURED FILM AND COATED ARTICLE

(71) Applicant: AGC Inc., Chiyoda-ku (JP)

(72) Inventors: Shun Saito, Tokyo (JP); Kouji Uchida, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 458 days.

This patent is subject to a terminal disclaimer.

(21) Appl. No.: 15/619,792

(22) Filed: Jun. 12, 2017

(65) Prior Publication Data

US 2017/0275491 A1 Sep. 28, 2017

Related U.S. Application Data

(63) Continuation of application No. 14/546,649, filed on Nov. 18, 2014, now Pat. No. 9,714,360, which is a continuation of application No. PCT/JP2013/067283, filed on Jun. 24, 2013.

(30) Foreign Application Priority Data

Jun. 29, 2012 (JP) .............................. JP2012-146412

(51) Int. Cl.
```
C09D 167/02    (2006.01)
C09D 127/16    (2006.01)
C09D 5/03      (2006.01)
C09D 127/12    (2006.01)
C09D 175/04    (2006.01)
C09D 7/48      (2018.01)
C23C 26/00     (2006.01)
C08K 5/00      (2006.01)
C08K 3/014     (2018.01)
C09D 7/63      (2018.01)
B05D 3/02      (2006.01)
C09D 7/61      (2018.01)
C09D 7/41      (2018.01)
```

(52) U.S. Cl.
CPC ............. *C09D 167/02* (2013.01); *C09D 5/03* (2013.01); *C09D 7/48* (2018.01); *C09D 127/12* (2013.01); *C09D 127/16* (2013.01); *C09D 175/04* (2013.01); *C23C 26/00* (2013.01); *B05D 3/02* (2013.01); *B05D 2401/32* (2013.01); *B05D 2506/10* (2013.01); *B05D 2508/00* (2013.01); *C08K 3/014* (2018.01); *C08K 5/005* (2013.01); *C09D 5/032* (2013.01); *C09D 5/036* (2013.01); *C09D 7/41* (2018.01); *C09D 7/61* (2018.01); *C09D 7/63* (2018.01); *Y02P 20/129* (2015.11); *Y10T 428/3154* (2015.04)

(58) Field of Classification Search
None
See application file for complete search history.

(56) References Cited

U.S. PATENT DOCUMENTS

| | | | | | |
|---|---|---|---|---|---|
| 4,413,095 A | * | 11/1983 | Mizuno | .................... | C08L 27/16 525/199 |
| 5,132,164 A | * | 7/1992 | Moriya | .................... | B32B 27/30 428/199 |
| 5,223,562 A | * | 6/1993 | Sagawa | .............. | C08G 18/6279 524/275 |
| 5,256,472 A | * | 10/1993 | Moriya | .................... | B32B 27/30 428/215 |
| 5,356,971 A | * | 10/1994 | Sagawa | .............. | C08G 18/6279 524/275 |
| 5,468,904 A | * | 11/1995 | Osawa | ..................... | C07C 49/84 522/45 |
| 5,985,444 A | * | 11/1999 | Olson | ................... | C08K 5/3475 428/357 |
| 6,710,137 B2 | * | 3/2004 | Matsumoto | ........... | C08G 18/341 106/287.25 |
| 9,714,360 B2 | * | 7/2017 | Saito | ......................... | C09D 5/03 |
| 10,246,592 B2 | * | 4/2019 | Saito | ......................... | C09D 7/48 |
| 10,246,603 B2 | * | 4/2019 | Yamamoto | ............... | C09D 7/40 |
| 10,536,087 B1 | * | 1/2020 | He | ........................... | H02M 1/08 |
| 10,563,087 B2 | * | 2/2020 | Saito | .................... | B05D 7/5323 |
| 2003/0045613 A1 | * | 3/2003 | Ohnishi | ..................... | C09D 5/03 524/115 |
| 2003/0088020 A1 | | 5/2003 | Loontjes et al. | | |

(Continued)

FOREIGN PATENT DOCUMENTS

EP 1 130 039 A1 9/2001
JP 03-095276 4/1991

(Continued)

OTHER PUBLICATIONS

Machine Translation, Seida, JP 2011-012119 (Year: 2011).*

(Continued)

*Primary Examiner* — Vivian Chen
(74) *Attorney, Agent, or Firm* — Oblon, McClelland, Maier & Neustadt, L.L.P.

(57) ABSTRACT

Provided is a powder coating composition, whereby a cured film excellent in water resistance, chemical resistance and weather resistance, can be formed by single coating operation, wherein a fluorinated resin layer and a polyester layer are layer-separated in the process of melting and curing the powder coating composition. A powder coating composition comprising a fluorinated resin (A), a polyester polymer (B), a curing agent (C) and an ultraviolet absorber (D), wherein the polyester polymer (B) is a polyester polymer comprising units derived from a $C_{8-15}$ aromatic polybasic carboxylic acid compound and units derived from a $C_{2-10}$ a polyhydric alcohol compound.

19 Claims, No Drawings

(56) References Cited

U.S. PATENT DOCUMENTS

| | | | |
|---|---|---|---|
| 2004/0176554 A1* | 9/2004 | Ishida | C08F 214/186 |
| | | | 526/242 |
| 2006/0079650 A1* | 4/2006 | Stevenson | C09D 167/02 |
| | | | 525/440.02 |
| 2008/0233300 A1* | 9/2008 | Cinoman | C08G 59/182 |
| | | | 427/386 |
| 2011/0195256 A1 | 8/2011 | Morikawa et al. | |
| 2011/0297228 A1* | 12/2011 | Li | B32B 27/40 |
| | | | 136/259 |
| 2013/0196062 A1 | 8/2013 | Wang et al. | |

FOREIGN PATENT DOCUMENTS

| | | |
|---|---|---|
| JP | 5-247380 A | 9/1993 |
| JP | 09-053026 | 2/1997 |
| JP | 11-124541 | 5/1999 |
| JP | 2000-26793 A | 1/2000 |
| JP | 2003-128994 A | 5/2003 |
| JP | 2008-266361 | 11/2008 |
| JP | 2011-011117 A * | 1/2011 |
| JP | 2011-12119 | 1/2011 |
| JP | 2011-012119 A * | 1/2011 |
| JP | 2011012119 A * | 1/2011 |
| JP | 2012-040503 | 3/2012 |
| JP | 2012-041383 A * | 3/2012 |
| JP | 2012-41383 A | 3/2012 |
| KR | 101395814 B * | 5/2014 |
| TW | 201016804 A | 5/2010 |
| WO | 99/60066 A1 | 11/1999 |
| WO | 2012/048650 A1 | 4/2012 |

OTHER PUBLICATIONS

"BASF—Tinuvin 111" (Nov. 2010). (Year: 2010).*
International Search Report dated Sep. 10, 2013 in PCT/JP2013/067283 filed Jun. 24, 2013.
Zhuang Aiyu, "Information and Application Manual of Powder Coating in China" Chemical Industry Press, 2011, 10 pages (with English language translation).

* cited by examiner

POWDER COATING COMPOSITION, PROCESS FOR PRODUCING CURED FILM AND COATED ARTICLE

CROSS-REFERENCE TO RELATED APPLICATIONS

This application is a continuation application of U.S. patent application Ser. No. 14/546,649 filed Nov. 18, 2014, now U.S. Pat. No. 9,714,360, which is in turn a continuation application of International Application No. PCT/JP2013/067283, filed on Jun. 24, 2013, which is based upon and claims the benefit of priority from Japanese Patent Application No. 2012-146412 filed on Jun. 29, 2012. The contents of these applications are incorporated herein by reference in their entireties.

TECHNICAL FIELD

The present invention relates to a powder coating composition, a process for producing a cured film, and a coated article.

BACKGROUND ART

In recent years, much attention has been paid to problems of environmental destruction on global scale such as global warming, ozone depletion, acid rain, etc. and it is urged to internationally take countermeasures against global pollution. Along with this problem, various regulations have been set for environmental conservation. Under such circumstances, it is a serious problem to discharge organic solvents (VOC) into the atmosphere, and in each industrial field, along the trend for tightening regulations against VOC, it is promoted to seek alternatives to organic solvents (alternatives to VOC). In the paint industry, as an alternative to a conventional organic coating material, a powder coating material is expected to be promising as a coating material which contains no VOC and which is environmentally friendly such that it does not require exhaust treatment or waste water treatment, and it can be recovered for reuse.

As a powder coating material, an acrylic resin type, a polyester resin type and an epoxy resin type have been mainly used. However, there is a problem that such coating materials are poor in weather resistance.

On the other hand, as a coating material to solve such a problem, a fluorinated resin powder coating material comprising a fluorinated resin has been developed (for example, Patent Document 1).

Further, for reducing the cost, etc. a powder coating material in which a polyester resin and a fluorinated resin are blended has been proposed (for example, Patent Document 2).

As compared to the acrylic resin type, polyester resin type and epoxy resin type powder coating materials, the powder coating material in which a polyester resin and a fluorinated resin are blended is excellent in weather resistance, however, depending on a kind of a polyester to be used, it is difficult to obtain the effect to improve the weather resistance derived from a fluorinated resin layer in some cases.

Further, by coating a polyester resin with a fluorinated resin to form a double coating, a coating film which is excellent in weather resistance can be formed at a low cost. However, steps for forming the coating film are complicated since it is necessary to carry out double coating.

PRIOR ART DOCUMENTS

Patent Documents

Patent Document 1: JP-A-2008-266361
Patent Document 2: JP-A-2011-12119

DISCLOSURE OF INVENTION

Technical Problem

It is an object of the present invention to provide a powder coating composition, whereby a cured film which has a fluorinated resin layer and a polyester layer and is excellent in water resistance, chemical resistance and weather resistance, can be formed by single coating operation.

Solution to Problem

The present invention provides a powder coating composition, a process for producing a cured film and a coated article, which have the following constructions [1] to [12].
[1] A powder coating composition comprising a fluorinated resin (A), a polyester polymer (B), a curing agent (C) and an ultraviolet absorber (D), wherein the polyester polymer (B) is a polyester polymer comprising units derived from a $C_{8-15}$ aromatic polybasic carboxylic acid compound and units derived from a $C_{2-10}$ a polyhydric alcohol compound.
[2] The powder coating composition according to the above [1], wherein the fluorinated resin (A) is a hydroxy group-containing fluorinated polymer (A1).
[3] The powder coating composition according to the above [1], wherein the fluorinated resin (A) is a polyvinylidene fluoride.
[4] A powder coating composition comprising a hydroxy group-containing fluorinated polymer (A1), a polyester polymer (B), a blocked isocyanate curing agent (C1) and an ultraviolet absorber (D1) which is selected from the group consisting of an inorganic ultraviolet absorber and an organic ultraviolet absorber having a molecular weight of from 200 to 1,000 and a melting point of from 50 to 150° C., wherein the polyester polymer (B) is a polyester polymer comprising units derived from a $C_{8-15}$ aromatic polybasic carboxylic acid compound and units derived from a $C_{2-10}$ a polyhydric alcohol compound.
[5] The powder coating composition according to any one of the above [1] to [4], wherein the units derived from the aromatic polybasic carboxylic acid compound in the polyester polymer (B) are at least one type selected from the group consisting of units derived from phthalic acid, units derived from isophthalic acid, units derived from terephthalic acid, units derived from naphthalenedicarboxylic acid, units derived from trimellitic acid and units derived from pyromellitic acid.
[6] The powder coating composition according to any one of Claims the above [1] to [5], wherein the polyester polymer (B) contains from 30 to 60% of units derived from the aromatic polybasic carboxylic acid compound per the total units in the polyester polymer and has a number average molecular weight of from 500 to 5,000.
[7] The powder coating composition according to any one of the above [1] to [6], wherein the content ratio of the fluorinated resin (A) to the polyester polymer (B) is from 70/30 to 10/90 by mass ratio.
[8] The powder coating composition according to any one of the above [1] to [7], wherein the content of the curing agent (C) is from 10 to 100 parts by mass per 100 parts by mass in total of the fluorinated resin (A) and the polyester polymer (B).

[9] The powder coating composition according to any one of the above [1] to [8], which further contains a pigment (E).

[10] The powder coating composition according to any one of the above [1] to [9], which further contains a hindered amine light stabilizer (G) having a molecular weight of from 300 to 5,000 and a melting point of from 50 to 250° C.

[11] A process for producing a cured film, which comprises coating a substrate with the powder coating composition as defined in any one of the above [1] to [10] to form a coating film made of a melt of the powder coating composition on the substrate, reacting reactive components in the powder coating composition and then cooling the coating film in the molten state to room temperature for solidification.

[12] A coated article having a cured film produced by the process as defined in the above [11] on a surface.

Advantageous Effects of Invention

According to the powder coating composition of the present invention, even though a coating film is formed by single coating operation, in the process of melting and curing the powder coating composition, a fluorinated resin layer and a polyester layer are layer-separated to form a cured film having a bilayer structure, whereby the cured film which is excellent in water resistance, chemical resistance and weather resistance can be formed.

DESCRIPTION OF EMBODIMENTS

In the present specification, "coating film" is a film made of a melt of the powder coating composition formed by applying the powder coating composition of the present invention.

In the present specification, "cured film" is a film formed by solidifying the above coating film.

In the present specification, "single coating operation" is a method in which coating is carried out only once.

In the present specification, "the process of melting and curing" the powder coating composition is a process of melting a powder coating composition to a molten state, reacting reactive components in the powder coating composition, followed by solidification.

In the present specification, "units" means portions derived from a monomer which are present in and constitute a polymer. Units derived from a monomer having a carbon-carbon unsaturated double bond, by addition polymerization of the monomer, are bivalent units formed by opening of the unsaturated double bond. Units which constitute a polyester polymer and are derived from a polybasic carboxylic acid compound are mono- or higher valent units wherein a hydroxy group is removed from at least one carboxy group in the polybasic carboxylic acid compound, and units derived from a polyhydric alcohol compound are mono- or higher valent units wherein a hydrogen atom is removed from at least one hydroxy group in the polyhydric alcohol. Further, units of which the structure is chemically modified after forming a polymer are also referred to as units.

Further, hereinafter, units derived from each monomer compound may sometimes be called by adding "units" to the name of the monomer compound.

[Powder Coating Composition]

When coating a substrate with the powder coating composition of the present invention by single coating operation to form a coating film made of a melt of the powder coating composition, reacting reactive components in the composition and then cooling the coating film for solidification, a fluorinated resin layer containing a fluorinated resin (A) as the main component and a polyester layer containing a polyester polymer (B) as the main component are layer-separated. The polyester layer is disposed on the substrate side, and the fluorinated resin layer is disposed on the air side.

The powder coating composition of the present invention comprises a fluorinated resin (A), a polyester polymer (B), a curing agent (C) and an ultraviolet absorber (D). Further, as a case requires, a curing catalyst (F), a hindered amine stabilizer (G) and another component (H) may be contained.

Now, the present invention will be described in detail.

1. Fluorinated Resin (A)

The fluorinated resin (A) of the present invention is made of a fluorinated polymer such as a homopolymer or copolymer of a fluoroolefin. The copolymer may, for example, be a copolymer of at least two types of fluoroolefins, a copolymer of at least one type of fluoroolefin and at least one type of fluorinated monomer other than the fluoroolefin, or a copolymer of at least one type of fluoroolefin and at least one type of a monomer containing no fluorine atom.

The fluoroolefin is a compound wherein at least one hydrogen atom in a hydrocarbon olefin (general formula: $C_nH_{2n}$) is substituted by a fluorine atom.

The number of carbon atoms in the fluoroolefin is preferably from 2 to 8, more preferably from 2 to 6.

The number of fluorine atoms in the fluoroolefin is preferably at least 2, more preferably 3 to 4. When the number of fluorine atoms is at least 2, the weather resistance of a cured film is excellent. In the fluoroolefin, at least one hydrogen atom which is not substituted by a fluorine atom may be substituted by a chlorine atom.

When a chlorine atom is contained, a pigment, etc., particularly a colored organic pigment such as cyanine blue or cyanine green, can be easily dispersed. Further, the glass transition temperature of a fluorinated polymer may be designed to be at least 50° C., whereby blocking can be prevented.

The fluoroolefin is preferably at least one member selected from the group consisting of tetrafluoroethylene (TFE), chlorotrifluoroethylene (CTFE), hexafluoropropylene, vinylidene fluoride and vinyl fluoride, more preferably tetrafluoroethylene or chlorotrifluoroethylene.

One type of the fluoroolefin may be used alone, or two or more types may be used in combination.

Fluoroolefin units are preferably units which are directly formed by polymerizing the fluoroolefin.

The fluorinated resin (A) in the present invention may, for example, be a tetrafluoroethylene-perfluoro(alkyl vinyl ether) copolymer (hereinafter referred to also as "PFA"), a tetrafluoroethylene-hexafluoropropylene copolymer (hereinafter referred to also as "FEP"), a tetrafluoroethylene-perfluoro(alkyl vinyl ether)-hexafluoropropylene copolymer (hereinafter referred to also as "EPA"), an ethylene-tetrafluoroethylene copolymer (hereinafter referred to also as "ETFE"), a polyvinylidene fluoride (hereinafter referred to also as "PVDF"), a polyvinyl fluoride (hereinafter referred to also as "PVF"), a polychlorotrifluoroethylene (hereinafter referred to also as "PCTFE") or an ethylene-chlorotrifluoroethylene copolymer (hereinafter referred to also as "ECTFE").

As a case requires, such a fluoropolymer may contain units derived from another monomer, so long as its essential properties are not impaired.

The units derived from another monomer are units based on a monomer other than the monomers which form essential units as units constituting the fluorinated polymer (such as ethylene and tetrafluoroethylene in ETFE, or tetrafluoroethylene and perfluoro(alkyl vinyl ether) in PFA).

PVDF is particularly preferred, since the adhesion to a substrate (particularly a substrate made of aluminum) is excellent, and a curtain wall made of aluminum can be easily fixed with a sealing agent.

The fluorinated resin (A) in the present invention is preferably a fluorinated polymer having a melting point of at most 300° C. A fluorinated polymer having a melting point of at most 200° C. is more preferred, and a fluorinated polymer having a melting point of at most 180° C. is particularly preferred. If the melting point is at most the above range, the smoothness of a cured film is excellent.

The fluorinated resin (A) in the present invention may be a fluorinated polymer having a reactive group. The reactive group may, for example, be a hydroxy group, a carboxy group or an amino group. The fluorinated resin (A) is particularly preferably a fluorinated polymer (A1) having a hydroxy group (hereinafter referred to also as "hydroxy group-containing fluorinated polymer (A1)"). Since the hydroxy group-containing fluorinated polymer (A1) has a hydroxy group, in a case where an isocyanate curing agent (particularly blocked isocyanate curing agent (C1)) is used as a curing agent, the curing rate is high. Further, a pigment or the like is easily dispersed, and a cured film with a good gloss (at least 60 at 60° gloss) can be formed, such being preferred.

The hydroxy group-containing fluorinated polymer (A1) is preferably a hydroxy group-containing fluorinated polymer having units derived from a fluoroolefin, units derived from a monomer having a hydroxy group which is polymerizable with the fluoroolefin (hereinafter referred to as "monomer (a1)") and, as a case requires, units derived from another monomer (hereinafter referred to as "monomer (a2)") other than the fluoroolefin and the monomer (a1).

Further, the hydroxy group-containing fluorinated polymer (A1) may be a hydroxy group-containing fluorinated polymer in which a hydroxy group is introduced by converting a reactive group in the polymer. Such a hydroxy group-containing fluorinated polymer is preferably a fluorinated polymer (A1-2) obtained by reacting a fluorinated polymer having units derived from a fluoroolefin, units derived from a monomer having a reactive functional group other than a hydroxy group and, as a case requires, the monomer (a2), to a compound having a hydroxy group and a second reactive functional group which reacts to the above mentioned reactive functional group.

The monomer to be copolymerized with the fluoroolefin, such as the monomer (a1) or the monomer (a2), may be a monomer having a fluorine atom other than the fluoroolefin, however, a monomer having no fluorine atom is preferred.

The monomer (a1) is a monomer having a hydroxy group.

The monomer having a hydroxy group may, for example, be an allyl alcohol; a hydroxy alkyl vinyl ether such as 2-hydroxyethyl vinyl ether, 4-hydroxybutyl vinyl ether or cyclohexanediol monovinyl ether; a hydroxyalkyl allyl ether such as 2-hydroxyethyl allyl ether; a vinyl hydroxy alkanoate such as vinyl hydroxypropionate; or a (meth)acrylic acid hydroxy alkyl ester such as a hydroxyethyl (meth)acrylate.

As the monomer (a1), one type may be used alone, or two or more types may be used in combination.

The monomer (a2) is preferably a vinyl monomer, namely a compound having a carbon-carbon double bond. The vinyl monomer is excellent in alternate copolymerizability with a fluoroolefin, whereby the polymerization yield becomes high. Further, if an unreacted vinyl monomer remains, its influence on a cured film is small, and such a monomer can be easily removed in a production step.

The vinyl monomer may, for example, be a vinyl ether, an allyl ether, a vinyl carboxylate, an allyl carboxylate or an olefin.

The vinyl ether may, for example, be a cycloalkyl vinyl ether such as cyclohexyl vinyl ether (CHVE); or an alkyl vinyl ether such as nonyl vinyl ether, 2-ethyl hexyl vinyl ether, hexyl vinyl ether, ethyl vinyl ether, n-butyl vinyl ether or t-butyl vinyl ether.

The allyl ether may, for example, be an alkyl allyl ether such as ethyl allyl ether or hexyl allyl ether.

The vinyl carboxylate may, for example, be a vinyl ester of a carboxylic acid such as acetic acid, butyric acid, pivalic acid, benzoic acid or propionic acid.

Further, as a vinyl carboxylate having a branched alkyl group, commercially available VeoVa 9 or VeoVa 10 (trade name, manufactured by Shell Chemicals) or the like may be used.

The allyl carboxylate may, for example, be an allyl ester of the carboxylic acid mentioned in the above vinyl carboxylate.

The olefin may, for example, be ethylene, propylene or isobutylene.

As the monomer (a2), one type may be used alone, or two or more types may be used in combination.

The hydroxy group-containing fluorinated polymer (A1) is preferably a fluorinated copolymer obtainable by using as the fluoroolefin, tetrafluoroethylene or chlorotrifluoroethylene, as the monomer (a1), a cycloalkyl vinyl ether or an alkyl vinyl ether, and as the monomer (a2), a hydroxyalkyl vinyl ether or a vinyl carboxylate. Particularly preferred is a copolymer of tetrafluoroethylene as the fluoroolefin, t-butyl vinyl ether as the monomer (a1), and a hydroxy alkyl vinyl ether and a vinyl carboxylate as the monomer (a2), or a copolymer of chlorotrifluoroethylene as the fluoroolefin, t-butyl vinyl ether as the monomer (a1), and a hydroxyalkyl vinyl ether and a vinyl carboxylate as the monomer (a2).

The proportion of the fluoroolefin units in the hydroxy group-containing fluorinated polymer (A1) is preferably from 30 to 70 mol %, more preferably from 40 to 60 mol %, per the total units in the hydroxy group-containing fluorinated polymer (A1). When the proportion of the fluoroolefin units is at least the above lower limit value, the weather resistance of a cured film is excellent. When the proportion of the fluoroolefin units is at most the above upper limit value, at the time of layer separation, the adhesion of a fluorinated resin layer and a polyester layer is excellent.

The proportion of the monomer (a1) units in the hydroxy group-containing fluorinated polymer (A1) is preferably from 0.5 to 20 mol %, more preferably from 1 to 15 mol %. When the proportion of the monomer (a1) is at least the above lower limit value, at the time of layer separation, the adhesion of a fluorinated resin layer and a polyester layer is excellent. When the proportion of the monomer (a1) units is at most the above upper limit value, the abrasion resistance of a cured film is excellent.

The proportion of the monomer (a2) in the hydroxy group-containing fluorinated polymer (A1) is preferably from 20 to 60 mol %, more preferably from 30 to 50 mol %. When the proportion of the monomer (a2) is at least the above lower limit value, the hydroxy group-containing fluorinated polymer (A1) has a suitable glass transition temperature (hereinafter referred to also as "Tg"), and a powder coating material can be easily produced. When the proportion of the monomer (a2) is at most the above upper limit value, the adhesion of a fluorinated resin layer and a polyester layer at the time of the layer-separation is excellent.

The number average molecular weight of the hydroxy group-containing fluorinated polymer (A1) is preferably from 3,000 to 50,000, more preferably from 5,000 to 30,000. When the number average molecular weight of the hydroxy group-containing fluorinated polymer (A1) is at least the above lower limit value, a cured film is excellent in water resistance and salt water resistance. When the number average molecular weight of the hydroxy group-containing fluorinated polymer (A1) is at most the above upper limit value, a cured film is excellent in smoothness.

The hydroxy value of the hydroxy group-containing fluorinated polymer (A1) is preferably from 5 to 100 mgKOH/g, more preferably from 10 to 80 mgKOH/g. When the hydroxy value is at least the above lower limit value, the adhesion of a fluorinated resin layer and a polyester layer at the time of the layer-separation is excellent. When the hydroxy value is at most the above upper limit value, a cured film is excellent in crack resistance under thermal cycles between a high temperature of at least 100° C. and a low temperature of at most 10° C. Further, the hydroxy value can be measured in accordance with JIS K 1557-1 (year 2007 edition).

Tg of the hydroxy group-containing fluorinated polymer (A1) is preferably from 40 to 150° C., more preferably from 45 to 120° C., further preferably from 50 to 100° C. When Tg is at least the lower limit value, a powder coating material can be easily produced. When Tg is at most the upper limit value, a cured film is excellent in smoothness.

2. Polyester Polymer (B)

"Polyester polymer" in the present specification is a polymer in which units derived from a polybasic carboxylic acid compound and units derived from a polyhydric alcohol compound are connected by ester bonds, and the polyester polymer may contain units other than these two types of units (for example, units derived from a hydroxy carboxylic acid compound, etc.).

The terminal of a polymer chain of a polyester polymer is a monovalent unit. In a case where the terminal unit is a unit derived from a polybasic carboxylic acid compound, the terminal unit has a carboxy group. In a case where the terminal unit is a unit derived from a polyhydric alcohol compound, the terminal unit has a hydroxy group.

Units other than the terminal unit are bi- or higher valent units, and a linear polymer consists solely of bivalent units, except terminal units. That is, except terminal units, a linear polyester polymer consists solely of bivalent units such as bivalent units derived from a polybasic carboxylic acid compound or bivalent units derived from a polyhydric alcohol compound. A branched polyester polymer has at least 1 tri- or higher valent unit and consists substantially solely of bivalent units, except the tri- or higher valent unit and the terminal units. The tri- or higher valent unit may, for example, be a unit obtained by removing the respective hydroxy groups from at least 3 carboxy groups of a tri- or higher polybasic carboxylic acid compound or a unit obtained by removing the respective hydrogen atoms from at least 3 hydroxy groups of a tri- or higher polyhydric alcohol compound.

Further, hereinafter, units derived from a polybasic carboxylic acid compound may be referred to as "polybasic carboxylic acid units", and units derived from a polyhydric alcohol compound may be referred to as "polyhydric alcohol units".

The polyester polymer (B) is a polymer having units derived from a $C_{8-15}$ aromatic polybasic carboxylic acid compound and units derived from a $C_{2-10}$ polyhydric alcohol compound.

The polyester polymer (B) is preferably a linear polymer or a branched polymer having a few branches, more preferably a linear polymer. Since a branched polymer having many branches tends to have a high softening point or a high melting temperature, the polyester polymer (B) which is a branched polymer is preferably a polymer having a softening point of at most 200° C. The polyester polymer (B) is preferably a polyester polymer which is solid at normal temperature and has a softening point of from 100 to 150° C.

The number average molecular weight is preferably at most 5,000, whereby the melt viscosity of a cured film can be made to be appropriately low. The mass average molecular weight is preferably from 10,000 to 20,000, whereby the melt viscosity of a cured film can be made to be appropriately low. The polyester polymer (B) is particularly preferably one having a number average molecular weight of at most 5,000 and a mass average molecular weight of from 10,000 to 20,000.

The polyester polymer (B) usually has a reactive group which reacts to a curing agent (C). At least one terminal unit of a polymer chain of the polyester polymer (B) is preferably a monovalent polybasic carboxylic acid unit or a monovalent polyhydric alcohol unit. In the former case, the unit has free carboxy groups which function as reactive groups, and in the latter case, the unit has free hydroxy groups which function as reactive groups. The unit having a reactive group may be a unit other than the terminal unit. For example, a bivalent polyhydric alcohol unit derived from a polyhydric alcohol compound having at least 3 hydroxy groups may be a unit having free hydroxy groups, and in such a case, polyester polymer (B) may have a bi- or higher valent unit having such reactive groups.

The reactive group in the polyester polymer (B) is preferably a hydroxy group, whereby a cured film is excellent in water resistance, alkali resistance and acid resistance. A polyester polymer usually has hydroxy groups and carboxy groups, and the polyester polymer (B) is preferably a polyester polymer mainly having hydroxy groups.

The hydroxy value of the polyester polymer (B) is preferably from 20 to 100 mgKOH/g, more preferably from 30 to 80 mgKOH/g. The acid value is preferably from 1 to 80 mgKOH/g, more preferably from 3 to 50 mgKOH/g. Further, the hydroxy value and the acid value can be measured in accordance with JIS K 0070 (year 1992 edition).

The polybasic carboxylic acid units in the polyester polymer (B) are units derived from a $C_{8-15}$ aromatic polybasic carboxylic acid compound. The $C_{8-15}$ aromatic polybasic carboxylic acid compound is a compound having an aromatic ring and at least 2 carboxy groups wherein carboxy groups bond to carbon atoms in the aromatic ring. Further, it may be an anhydride having a structure wherein two carboxy groups are dehydrated.

The aromatic ring is preferably a benzene ring or a naphthalene ring, more preferably a benzene ring. In the case of the benzene ring, two benzene rings may be contained in one molecule.

The number of carboxy groups in the aromatic polybasic carboxylic acid compound is preferably from 2 to 4, particularly preferably 2.

The $C_{8-15}$ aromatic polybasic carboxylic acid compound may, for example, be phthalic acid, isophthalic acid, terephthalic acid, naphthalene dicarboxylic acid, trimellitic acid, pyromellitic acid or phthalic anhydride.

The polybasic carboxylic acid units are preferably units derived from isophthalic acid, whereby a cured film is excellent in weather resistance.

The polyhydric alcohol units in the polyester polymer (B) are units derived from a $C_{2-10}$ polyhydric alcohol compound. The $C_{2-10}$ polyhydric alcohol compound is a compound having at least 2 hydroxy groups, preferably an aliphatic polyhydric alcohol or an alicyclic polyhydric alcohol, more preferably an aliphatic polyhydric alcohol. The number of hydroxy groups in the polyhydric alcohol compound is preferably from 2 to 4, particularly preferably 2.

The $C_{2-10}$ polyhydric alcohol compound may, for example, be ethylene glycol, diethylene glycol, triethylene glycol, 1,2-propandiol, 1,3-propandiol, 1,3-butanediol, 1,4-butanediol, 1,5-pentanediol, neopentyl glycol, spiroglycol, 1,10-decanediol, 1,4-cyclohexane dimethanol, trimethylolethane, trimethylolpropane, glycerin or pentaerythritol.

The polyhydric alcohol units are preferably units derived from a $C_{3-8}$ polyhydric alcohol, more preferably units derived from a $C_{4-6}$ polyhydric alcohol, whereby the adhesion to a substrate is excellent, and the flexibility is excellent, whereby if heat history (thermal cycle) is applied, the layer-separation from a fluorinated resin layer tends not to occur.

The polyhydric alcohol is preferably neopentyl glycol, 1,2-pentanediol, 1,5-pentanediol, trimethylolpropane or the like, more preferably from the viewpoint of the availability, neopentyl glycol or trimethylolpropane.

The polyester polymer (B) can be produced from the aromatic polybasic carboxylic acid compound and the polyhydric alcohol compound as starting materials by means of a standard method for producing a polyester polymer for a powder coating material. For example, the polyester polymer (B) can be obtained by subjecting the above starting materials to esterification reaction or ester exchange reaction at from 200 to 280° C., and then carrying out polycondensation by using a catalyst at from 230 to 250° C. under reduced pressure, followed by depolymerization with an alcohol component.

In order to easily form a cured film having a bilayer structure by layer separation of a fluorinated resin layer and a polyester layer in the process of melting and curing a powder coating composition, the polyester polymer (B) preferably has an appropriate ester group concentration and an appropriate aromatic ring concentration.

The ester group concentration is a proportion of ester groups in the polyester polymer as represented by mass %, and the ester group concentration can be obtained by calculation in accordance with the following formula.
(Ester Group Concentration)

$$\text{Ester group concentration (\%)} = 2m/[(a+b) \times m + a]$$

m: An average value of the number of units in a polyester polymer calculated from an average value of a molecular weight of the respective units and a number average molecular weight of the polyester polymer.

a: An average value of the number of carbon atoms in polyhydric alcohol units b: An average value of the number of carbon atoms in polybasic carboxylic acid units The ester group concentration in the polyester polymer (B) is preferably from 20 to 60 mass %, more preferably from 25 to 50 mass %, particularly preferably from 30 to 40 mass %.

The aromatic ring concentration is a proportion of aromatic rings in the polyester polymer (B) as represented by mass %, and the aromatic ring concentration can be obtained by calculation in accordance with the following formula.
(Aromatic Ring Concentration)

Aromatic ring concentration(mmoL/g)=[(the total number of aromatic rings in starting materials used for obtaining a polyester polymer(moL))/ (the total weight of starting materials used for obtaining the polyester polymer(g))]×1,000

The aromatic ring concentration in the polyester polymer (B) is preferably from 20 to 35 mass %, more preferably from 22 to 34 mass %, particularly preferably from 25 to 33 mass %.

The content of the polyester polymer (B) in the powder coating composition of the present invention is preferably from 10 to 90 mass %, more preferably from 30 to 70 mass %, per the fluorinated resin (A) in the powder coating composition.

3. Curing Agent (C)

"Curing agent (C)" in the present invention is a compound which reacts to reactive groups in the fluorinated resin (A) or the polyester polymer (B), to crosslink the polymer or to make its molecular weight high thereby to cure the polymer. The curing agent (C) has at least two reactive groups which react to reactive groups such as hydroxy groups or carboxy groups contained in the polymer. Further, as the reactive groups in the curing agent (C), reactive groups which easily react to reactive groups in the polymer at room temperature are not preferred, and preferred are reactive groups which react at the time of heat-melting the powder coating composition. For example, blocked isocyanate groups are preferred, rather than isocyanate groups having high reactivity at room temperature. When the powder coating composition is heat-melted, the blocked isocyanate groups become isocyanate groups by releasing the blocking agent, and such isocyanate groups will work as reactive groups.

As the curing agent (C), a known compound may be used, and for example, a blocked isocyanate curing agent, an amine curing agent such as a melamine resin, a guanamine resin, a sulfonamide resin, a urea resin or an aniline resin, a β-hydroxyalkylamide curing agent, or a triglycidyl isocyanurate curing agent may be mentioned.

In a case where the hydroxy group-containing fluorinated polymer (A1) is used as the fluorinated resin (A), an isocyanate curing agent or an amine curing agent is preferably used. Among them, a blocked isocyanate curing agent (C1) is particularly preferred, whereby the adhesion to a substrate, the processability of a coated product and the water resistance of a cured film are excellent.

In a case where a carboxy group-containing fluorinated polymer is used as the fluorinated resin (A), a β-hydroxyalkylamide curing agent or a triglycidyl isocyanurate curing agent is preferably used.

The softening temperature of the curing agent (C) is preferably from 10 to 120° C., more preferably from 40 to 100° C. If the softening temperature is lower than 10° C., a powder coating material is likely to be cured at room temperature, or particulate agglomerates are likely to be formed, such being undesirable. Further, if the softening temperature exceeds 120° C., it is difficult to uniformly disperse the curing agent (C) in a coating material at the time of melt-kneading to produce a powder coating material, and the smoothness, strength and moisture resistance, etc. of a cured film to be obtained tend to deteriorate.

The content of the curing agent (C) in the powder coating composition of the present invention is preferably from 1 to 50 parts by mass, preferably from 3 to 30 parts by mass in the powder coating composition (100 parts by mass).

As the curing agent (C), one type may be used alone, or two or more types may be used in combination.

The blocked isocyanate curing agent (C1) is preferably one which is solid at room temperature. The blocked isocyanate curing agent (C1) is preferably one produced by reacting an aliphatic, aromatic or aromatic-aliphatic diisocyanate with a low molecular weight compound having active hydrogen to obtain a polyisocyanate, which is then reacted with a blocking agent for masking. As specific examples of the diisocyanate, tolylene diisocyanate, 4,4'-diphenylmethane isocyanate, xylene diisocyanate, hexamethylene diisocyanate, 4,4'-methylenebis(cyclohexyl isocyanate), methyl cyclohexane diisocyanate, bis(isocyanate methyl) cyclohexane isophorone diisocyanate, dimer acid diisocyanate, lysine isocyanate, etc. may be mentioned.

The low molecular weight compound having active hydrogen may, for example, be water, ethylene glycol, propylene glycol, trimethylolpropane, glycerin, sorbitol, ethylenediamine, ethanolamine, diethanolamine, hexamethylenediamine, isocyanurate, uretdione, a low molecular weight polyester having a hydroxy group or a polycaprolacton.

The blocking agent may, for example, be an alcohol such as methanol, ethanol or benzyl alcohol, a phenol such as phenol or cresol, a lactam such as caprolactam or butyrolactam, or an oxime such as cyclohexanone, oxime or methyl ethyl ketooxime.

The content of the blocked isocyanate curing agent (C1) in the powder coating composition of the present invention is preferably an amount such that the molar ratio of isocyanate groups to hydroxy groups in the powder coating composition would be from 0.05 to 1.5, more preferably an amount such that it would be from 0.8 to 1.2. If the molar ratio is less than 0.05, the degree of curing of a coating material tends to be insufficient, and the adhesion, and the hardness, chemical resistance, etc. of a cured film tend to deteriorate. If the molar ratio exceeds 1.5, a cured film tends to be fragile, and the heat resistance, chemical resistance, moisture resistance, etc. of a cured film tend to deteriorate.

4. Ultraviolet Absorber (D)

The powder coating composition of the present invention contains a ultraviolet absorber (D) in order to protect the polyester layer. The deterioration of the polyester layer can be suppressed by the ultraviolet absorber (D), whereby a problem can be prevented such that the fluorinated resin layer is peeled from the polyester layer.

At the time of forming a cured film having bilayer structure of a fluorinated resin layer and a polyester layer, the ultraviolet absorber (D) may be localized in either the fluorinated resin layer or the polyester layer or may be contained in both layers. It is preferred that the ultraviolet absorber (D) is localized in a fluorinated resin layer in order to reduce the amount of ultraviolet rays which enter into the polyester layer, since ultraviolet rays impair mainly the polyester layer.

In order to facilitate localization of an ultraviolet absorber in the fluorinated resin layer in the process of melting and curing the powder coating composition, considering physical properties of the ultraviolet absorber, it is preferred to select an ultraviolet absorber which is likely to be localized in the fluorinated resin layer and use it as the ultraviolet absorber (D). For example, when a lipophilic ultraviolet absorber and a hydrophilic ultraviolet absorber are compared, the lipophilic ultraviolet absorber is more likely to be localized in the fluorinated resin layer. Further, depending on the type (the difference in chemical structure) and the difference in physical properties such as molecular weight, melting point and boiling point of the ultraviolet absorber, the affinity to the fluorinated polymer varies in some cases.

As the ultraviolet absorber (D), whichever an organic ultraviolet absorber or an inorganic ultraviolet absorber may be used.

As the ultraviolet absorber (D), one type may be used alone, or two or more types may be used in combination.

The organic ultraviolet absorber may, for example, be a salicylate, a benzotriazole, a benzophenone or a cyanoacrylate compound.

The organic ultraviolet absorber is preferably a compound having a molecular weight of from 200 to 1,000. When the molecular weight is at least 200, the organic ultraviolet absorber hardly evaporates in the process of melting and curing the powder coating composition, and thus can remain in a cured film. When the molecular weight is at most 1,000, the organic ultraviolet absorber can remain in the fluorinated resin layer.

The organic ultraviolet absorber is preferably a compound having a melting point of from 50 to 150° C. When the melting point is at least 50° C., the organic ultraviolet absorber hardly evaporates in the process of melting and curing and thus can remain in a cured film. When the melting point is at most 150° C., the organic ultraviolet absorber is easily melted in the process of melting and curing and thus can remain in the fluorinated resin layer.

The organic ultraviolet absorber is preferably a compound having a volatilization temperature of from 180 to 400° C., more preferably a compound having a volatilization temperature of from 220 to 350° C. Since a temperature condition of from 150 to 220° C. is required in the process of melting and curing, the above range is preferred so that the organic ultraviolet absorber hardly volatilizes and tends to remain in the fluorinated resin layer at a time of two layer separation in the process of melting and curing.

As the organic ultraviolet absorber, a commercially available product may be used. The commercially available product may, for example, be "Tinuvin 326" (molecular weight: 315.8, melting point: 139° C.), "Tinuvin 405" (molecular weight: 583.8, melting point: 74 to 77° C.), "Tinuvin 460" (molecular weight: 629.8, melting point: 93 to 102° C.), "Tinuvin 900" (molecular weight: 447.6, melting point: 137 to 141° C.) and "Tinuvin 928" (molecular weight: 441.6, melting point: 109 to 113° C.), manufactured by BASF, "Sanduvor VSU powder" (molecular weight: 312.0, melting point: 123 to 127° C.) manufactured by Clariant or "Hastavin PR-25 Gran" (molecular weight: 250.0, melting point: 55 to 59° C.) manufactured by Clariant.

The inorganic ultraviolet absorber may, for example, be a filler type inorganic ultraviolet absorber containing a ultraviolet absorbing oxide such as zinc oxide or cerium oxide.

It is preferred to use composite particles of zinc oxide and titanium oxide, composite particles of cerium oxide and titanium oxide, composite particles of zinc oxide and cerium oxide, composite particles of titanium oxide, zinc oxide and cerium oxide or the like.

The content of the ultraviolet absorber (D) in the powder coating composition of the present invention is preferably from 0.1 to 15 mass % per the fluorinated resin (A) in the powder coating composition. If the amount of the ultraviolet absorber (D) is too small, the effect to protect the polyester layer cannot be sufficiently obtained.

Further, in the case of the inorganic ultraviolet absorber (D), the content is particularly preferably from 0.01 to 3.0 mass %. The effect can be obtained with a small amount, and the deterioration is not likely to occur and thereby a life span is long. In the case of the organic type, the content is preferably from 0.1 to 5 mass %. Since the deterioration is likely to occur, it is required to be incorporated slightly more.

5. Pigment (E)

The powder coating composition of the present invention preferably further contains a pigment (E).

The pigment (E) is preferably at least one type selected from the group consisting of a glitter pigment, an anti-corrosive pigment, a coloring pigment and an extender pigment.

The glitter pigment is a pigment to make a coating film glitter. The glitter pigment may, for example, be an aluminum powder, a nickel powder, a stainless steel powder, a copper powder, a bronze powder, a gold powder, a silver powder, a mica powder, a graphite powder, glass flakes or a scaly iron oxide powder.

The anti-corrosive pigment is a pigment to prevent corrosion or deterioration of a substrate which is required to have an anti-corrosive property. The anti-corrosive pigment is preferably a leadless anti-corrosive pigment of which environmental burden is low. The leadless anti-corrosive pigment may, for example, be zinc cyanamide, zinc oxide, zinc phosphate, calcium magnesium phosphate, zinc molybdate, barium borate or zinc calcium cyanamide.

The coloring pigment is a pigment for coloring a coating film. The coloring pigment may, for example, be titanium oxide, carbon black, iron oxide, phthalocyanine blue, phthalocyanine green, quinacridone, isoindolinone, benzoimidazolone or dioxazine.

The extender pigment is a pigment to improve the hardness of a coating film and increase the thickness of a coating film. Further, it is preferably incorporated so that when a coated substrate is cut, the appearance of the cut cross section is made to be good. The extender pigment may, for example, be talc, barium sulfate, mica or calcium carbonate.

With an inorganic pigment containing titanium oxide, in high temperature and high humidity regions, a photocatalytic reaction tends to progress. Such a photocatalytic reaction is accelerated by moisture and ultraviolet rays. An inorganic pigment tends to be localized in the polyester layer, and herefore, titanium oxide tends to be localized in the polyester layer. On the other hand, moisture hardly permeates the fluorinated resin layer at the surface of the cured film formed from the powder coating composition of the present invention, whereby moisture hardly penetrates to the polyester layer from the surface of the cured film. Thus, if titanium oxide is contained in the polyester layer, since the amount of moisture is small, the polyester layer tends not to be impaired by a photocatalytic reaction. Accordingly, even in the case of a powder coating composition containing an inorganic pigment including titanium oxide as a pigment, a cured film which is excellent in weather resistance can be obtained.

Titanium oxide is preferably one which is surface-treated so that a photocatalytic reaction is prevented. Specifically, preferred is titanium oxide which is surface treated with silica, alumina, zirconia, selenium, an organic component such polyol or the like, and more preferred is titanium oxide, of which the content of titanium oxide is adjusted to from 83 to 90 mass % by such a surface treatment. When the content of titanium oxide is at least the above lower limit value, the degree of whiteness of the cured film is excellent. When the content of titanium oxide is at most the above upper limit value, the polyester layer tends not to deteriorate, and the fluorinated resin layer hardly peels.

A commercially available titanium oxide may be used. The commercial available product may, for example, be "TIPAQUE PFC105" (titanium oxide content: 87 mass %) manufactured by Ishihara Sangyo Kaisha, Ltd., "TIPAQUE CR95" (titanium oxide content: 90 mass %) manufactured by Ishihara Sangyo Kaisha, Ltd., "D918" (titanium oxide content: 85 mass %) manufactured by Sakai Chemical Industry Co., Ltd. or "Ti-Pure R960" (titanium oxide content: 89 mass %) manufactured DuPont or "Ti-Select" (titanium oxide content: 90 mass %) manufactured by DuPont.

The content of the pigment (E) in the powder coating composition of the present invention is preferably from 20 to 200 mass %, more preferably from 50 to 150 mass %, per the fluorinated resin (A) in the powder coating composition.

6. Curing Catalyst (F)

The powder coating composition of the present invention preferably contains a curing catalyst in order to accelerate the curing reaction and impart good chemical properties and physical properties to the cured film.

In a case where a blocked isocyanate curing agent (C1) is used, the curing catalyst is preferably a tin catalyst such as tin octylate, tributyltin dilaurate or dibutyltin dilaurate.

As the curing catalyst, one type may be used alone, or two or more types may be used in combination.

The content of the curing catalyst in the powder coating composition of the present invention is preferably from 0.0001 to 10.0 parts by mass, per the total 100 parts by mass of the solid components excluding the pigment. When the content of the curing catalyst is at least 0.0001 part by mass, the effect of the catalyst tends to be sufficiently obtained. When the content of the curing catalyst is at most 10.0 parts by mass, a gas such as air included in the powder coating composition in the process of melting and curing the powder coating composition can be easily deaerated, whereby the deterioration of the heat resistance, weather resistance and water resistance of the cured film due to residual gas is small.

7. Hindered Amine Light Stabilizer (G)

The powder coating composition of the present invention preferably contains a hindered amine light stabilizer (G) in order to protect the polyester layer from ultraviolet rays which transmit through the fluorinated resin layer.

The hindered amine light stabilizer (G) is preferably a hindered amine light stabilizer having a molecular weight of from 300 to 5,000 and a melting point of from 50 to 250° C. from the viewpoint of easily entering into the polyester layer in the process of melting and curing the powder coating composition.

From the viewpoint of uniformly dispersing in the powder coating composition at the time of kneading, a hindered amine light stabilizer having a molecular weight of from 400 to 4,000 and a melting point of from 60 to 200° C. is more preferred.

As the hindered amine light stabilizer (G), one type may be used alone, or two or more type may be used in combination.

A commercially available hindered amine stabilizer (G) may be used. The commercially available product may, for example, be "Tinuvin 111FDL" (molecular weight: 2,000 to 4,000, melting point: 63° C.), "Tinuvin 144" (molecular weight: 685, melting point: 146 to 150° C.) and "Tinuvin 152" (molecular weight: 756.6, melting point: 83 to 90° C.), manufactured by BASF, "Sanduvor 3051 powder" (molecular weight: 364.0, melting point: 225° C.) manufactured by Clariant, "Sanduvor 3070 powder" (molecular weight: 1,500, melting point: 148° C.) manufactured by Clariant, or "VP Sanduvor PR-31" (molecular weight: 529, melting point: 120 to 125° C.) manufactured by Clariant.

The content of the hindered amine light stabilizer (G) in the powder coating composition of the present invention is preferably from 0.05 to 20 mass %, per the fluorinated resin (A) in the powder coating composition. In a case where the fluorinated resin (A) is a hydroxy group-containing fluorinated polymer (A1), the content is particularly preferably from 0.1 to 15 mass %. If the amount of the hindered amine light stabilizer (G) is too small, the effect to protect the polyester layer cannot be sufficiently obtained, and if the content is too large, the effect is saturated.

8. Another Component (H)

Depending on the purpose, the powder coating composition of the present invention may contain a flatting agent such as a ultrafine powder synthetic silica; a nonionic, cationic or anionic surfactant; a leveling agent; a surface modification agent (improving the surface smoothness of the cured film); a degasser (one having an effect to discharge air contained in the powder, a blocking agent discharged from the curing agent (C), moisture, etc. to outside of the coating film to prevent them from remaining in the coating film, and it is usually solid, however, when melted, it has a remarkably low viscosity); a filler; a heat stabilizer; a thickener; a dispersing agent; an antistatic agent; an anti-corrosive agent; a silane coupling agent; a stain-proofing agent; a low staining treating agent or the like. Further, a nonfluorinated resin (except polyester polymer (B)) such as an acrylic resin or an epoxy resin or the like may be contained.

The dispersibility of a pigment can be improved by an acrylic resin. The acrylic resin is preferably a resin having a reactive group such as a carboxy group or a hydroxy group and Tg of from 30 to 60° C. When Tg is at least the above lower limit value, blocking hardly occurs, and when Tg is at most the above upper limit value, the cured film is excellent in surface smoothness. The acrylic resin is preferably a resin having a number average molecular weight of from 5,000 to 50,000. When the number average molecular weight is at least the above lower limit value, blocking hardly occurs, and when the number average molecular weight is at most the above upper limit value, the cured film is excellent in surface smoothness. The acrylic resin is preferably a resin having a carboxy group and an acid value of from 150 to 400 mgKOH/g. When the acid value is at least the above lower limit value, the effect to improve the dispersibility of a pigment can be obtained, and when the acid value is at most the above upper limit value, the cured film is excellent in moisture resistance.

The total content of another component in the powder coating composition of the present invention is preferably at most 45 mass %, more preferably at most 30 mass %. Particularly, in a case where an acrylic resin is used, the content is more preferably from 1 to 10 mass %.

[The Process for Producing Powder Coating Composition]

The powder coating composition of the present invention can be produced by a known method. For example, preferred is a method of preliminarily pulverizing components (A) to (D) and as a case requires, components (E) to (H) (hereinafter generally referred to also as "starting materials") into powders respectively and then mixing them, a method of mixing starting materials in a solid state and then pulverizing them into a powder, or a method of mixing starting materials in a solid state, followed by melt-kneading, cooling into aggregates and pulverizing them into a powder. Since respective components are uniformly distributed in a powder to be obtained, and thereby a cured film to be obtained is excellent in uniformity, preferred is the method of mixing starting materials in a solid state, followed by melt-kneading, cooling into aggregates and pulverizing them into a powder.

Starting materials in a solid state can be mixed by using a mixer such as a rapid mixer, a V-type mixer or an inversion mixer. It is preferred to use the respective components in a powder state. It is preferred to preliminary pulverize the respective components into a powder state.

The melt-kneading can be carried out by using a various type of an extruder such as a single-screw type, a double-screw type or a planetary gear type. A mixture of the respective component is kneaded in a heat-melted state to homogenize the respective components. It is preferred that an extruded melt-kneaded product is cooled and pelletized.

The pellets can be pulverized by using a pulverizer such as a pinmill, a hummermill or a jetmill. After the pulverization, it is preferred to carry out classification. In a case where classification is carried out, it is preferred to remove at least either particles having a particle size of less than 10 μm or particles having a particle size of larger than 100 μm.

For example, the particle size of the powder coating composition of the present invention is preferably from about 25 to 50 μm by a 50% average volume particle size distribution. The measurement of the particle size of the powder coating composition is usually carried out by using a particle size measuring machine of a type to measure a potential change during passage through pores, of a laser diffraction system, of a type to judge an image, or of a sedimentation rate measuring system.

[The Process for Producing Cured Film]

The cured film of the present invention is preferably produced by coating a substrate with the powder coating composition of the present invention to form a coating film made of a melt of the powder coating composition on the substrate, reacting reactive components in the powder coating composition and then cooling the coating film in a molten state to room temperature (from 20 to 25° C.) for solidification.

The coating film made of a melt of the powder coating composition may be formed at the same time as coating the substrate with the powder coating composition or may be formed by depositing a powder of the powder coating composition on a substrate, followed by heat-melting the powder on the substrate.

Since the reaction of reactive components in the powder coating composition starts almost at the same time as heat-melting the powder coating composition, it is necessary to heat-melt the powder coating composition and deposit it on the substrate almost simultaneously, or it is necessary to carry out heat-melting after deposition on the substrate.

Depending on types and compositions of starting material components of the powder coating composition, a desired thickness of the cured film, etc., the heating temperature (hereinafter referred to also as "firing temperature") for heating and melting the powder coating composition and maintaining a molten state for a predetermined time and the heat retention time (hereinafter referred to also as "firing time") may be properly selected. Particularly, the firing temperature is set depending on the reaction temperature of a curing agent (C) to be used. For example, in a case where a blocked polyisocyanate curing agent (C1) is used as the curing agent (C), the firing temperature is preferably from about 170 to 210° C. The firing time is preferably from 5 to 120 minutes, more preferably from 10 to 60 minutes.

The cooling after the firing may be quenching or annealing. However, the annealing is preferred, since interface peeling between the fluorinated resin layer and the polyester layer due to curing shrinkage hardly occurs.

(Coating Method)

The method of coating the powder coating composition of the present invention may, for example, be an electrostatic coating method, an electrostatic spraying method, an electrostatic dipping method, a misting method, a fluidized-bed dipping method, a spray painting method, a spraying method, a flame spraying method or a plasma spraying method.

The electrostatic coating method by a powder coating gun is preferred, since even in a case where the coating film is formed into a thin film, the smoothness of the coating film is excellent, and the masking property of the coating film is excellent. As the powder coating gun, a corona charging coating gun or a frictional electrification coating gun may be mentioned. In the case of the corona charging coating gun, the powder coating composition is subjected to corona discharging treatment and then sprayed, and in the case of the frictional electrification coating gun, the powder coating composition is subjected to frictional electrification treatment and then sprayed.

The discharge amount of the powder coating composition from the powder coating gun is preferably set to be from 50 to 200 g/min. Further, the distance from the top of a gun part of the powder coating gun to the substrate is preferably set to be from 150 to 400 mm from the viewpoint of the coating efficiency.

In a case where coating is carried out by discharging the powder coating composition from a corona charging coating gun, the charged voltage applied to components constituting the powder coating composition at the time of corona discharging treatment is from −50 to −100 KV, and from the viewpoint of the coating efficiency (the percentage of the powder coating composition deposited on the substrate) and the excellent appearance of the coating film, more preferably from −60 to −80 KV.

On the other hand, in a case where coating is carried out by discharging the powder coating composition from a frictional electrification coating gun, frictional electrification treatment is preferably carried out so that the inner generated current of the powder coating composition would be from 1.0 to 8.0 μA, from the viewpoint of the coating efficiency and the excellent appearance of the coating film.

In a case where the electrostatic coating method is industrially carried out, for example, an uncoated mirror is installed, a conductive horizontal belt conveyor earthed for earthing is installed in a coating room, and a gun is installed at the upper part of the coating room. Here, it is preferred that the width of a coating pattern is from 50 to 500 mm, the driving speed of a gun is from 1 to 30 m/min, and the conveying speed is from 1 to 50 m/min, and depending on the purpose, proper conditions are selected within these ranges.

As a method for forming a relatively thick cured film, a fluidized-bed dipping method is preferred. It is preferred to carry out the fluidized-bed dipping method as follows. In a fluid bath in which a powder supported by gas such as air is contained, a substrate of which a coated surface is heated at a temperature higher than the melting temperature of the powder coating composition is dipped to deposit and melt the powder on the coated surface of the substrate thereby to form a coating film having a predetermined film thickness. Then, the coated substrate is taken out from the fluidized bath, and as a case requires, the melting state of the coating film is maintained for a predetermined time, and the coating film in the melting state is cooled for solidification to form a cured film on the substrate. The film thickness of the cured film formed by means of the fluidized-bed method is not particularly restricted, however, it is preferably from 100 to 1,000 μm.

The temperature in the fluid bath in the fluidized-bed dipping method is preferably from 15 to 55° C., and the temperature of gas such as air blown into the bath for fluidizing the powder is preferably from 15 to 55° C. The temperature of the substrate of at least the coated surface at the time of dipping in the fluid bath is preferably from 300 to 450° C., and the time for dipping the substrate in the fluid bath is preferably from 1 to 120 seconds. It is preferred that the substrate taken out from the fluid bath is maintained at a temperature of from 150° C. to 250° C. for 1 to 5 minutes and then cooled to room temperature.

The material of the substrate is preferably a metal such as aluminum, iron or magnesium.

The thickness of the cured film is not particularly restricted, however, it is usually at most 200 μm. It is preferably from 100 to 200 μm in applications which are required to have weather resistance such as an outside part of an air conditioner and a pole of a traffic light put on water front.

[Operation Mechanism]

The powder coating composition of the present invention comprises a fluorinated resin (A) and a polyester polymer (B), whereby a cured film in which a fluorinated resin layer comprising the fluorinated resin (A) as the main component and a polyester layer comprising the polyester polymer (B) as the main component are layer-separated, can be obtained. The polyester layer is formed on a substrate side, and the fluorinated resin layer is formed on air side. Thus, a cured film excellent in water resistance, chemical resistance and weather resistance can be obtained.

EXAMPLES

Now, the present invention will be described in further detail with reference to Examples. But it should be understood that the present invention is by no means restricted thereto.

Examples 1 to 12 are Production Examples, Examples 14, 15, 20, 21, 23, 24 and 26 to 36 are Working Examples, and Examples 16 to 19, 22, 25 and 37 are Comparative Examples.

[Evaluation Method]

(The Glass Transition Temperature (Tg) and the Number Average Molecular Weight (Mn) of a Fluorinated Copolymer, a Polyester Polymer and an Acrylic Resin)

Tg is a value measured by a differential scanning calorimeter (DSC). Mn is a value obtained by a gel permeation chromatography (GPC) as a polystyrene conversion.

Example 1: Preparation of Hydroxy Group-Containing Fluorinated Copolymer (A1-1)

Into a stainless steel autoclave having an inner volume of 250 mL and provided with a stirrer, 51.2 g of cyclohexyl vinyl ether (CHVE) (corresponding to the monomer (a2)), 13.3 g of hydroxybutyl vinyl ether (HBVE) (corresponding to the monomer (a1)), 55.8 g of xylene, 15.7 g of ethanol, 1.1 g of potassium carbonate, 0.7 g of a xylene solution containing 50 mass % of tert-butyl peroxypivalate (PBPV) and 63 g of chlorotrifluoroethylene (CTFE) (corresponding to the fluoroolefin) were introduced. Then, the temperature was gradually raised, and when it reached 55° C., such temperature was kept for 20 hours. After that, the temperature was raised to 65° C. and kept for 5 hours. Then, the mixture was cooled and filtrated to remove a residue, and 119.9 g of a hydroxy group-containing fluorinated polymer (A1-1) was obtained. The obtained hydroxy group-containing fluorinated polymer (A1-1) had Tg of 54° C. and Mn of 12,000.

Example 2: Preparation of Hydroxy Group-Containing Fluorinated Polymer (A1-2)

Into a stainless steel autoclave having an inner volume of 250 mL and provided with a stirrer, 36.5 g of tert-butyl vinyl ether (t-BuVE) (corresponding to the monomer (a2)), 3.8 g of ethyl vinyl ether (EVE) (corresponding to the monomer (a2)), 13.7 g of hydroxybutyl vinyl ether (HBVE) (corresponding to the monomer (a1)), 57.5 g of xylene, 16.2 g of ethanol, 1.1 g of potassium carbonate, 0.7 g of a xylene solution containing 50 mass % of tert-butyl peroxypivalate (PBPV) and 65 g of chlorotrifluoroethylene (CTFE) (corresponding to the fluorolefin), were introduced. The subsequent steps were carried out in the same manner as in Example 1 to obtain 111.9 g of a hydroxy group-containing fluorinated polymer (A1-2). The obtained hydroxy group-containing fluorinated polymer (A1-2) had Tg of 54° C. and Mn of 18,000.

Example 3: Fluorinated Polymer (A-3)

A commercially available polyvinylidene fluoride (PVDF) mentioned below was obtained and used.
Trade name: "PVDF DS203", manufactured by SHENXHOU NEWMATERIAL CO., LTD.
Mass average molecular weight (Mw): 270,000
Number average molecular weight (Mn): 160,000
Melting point: 170° C.

Example 4: Preparation of Polyester Polymer (B-1)

Into a stainless steel autoclave having an inner volume of 250 mL and provided with a stirrer, 31.7 g of isophthalic acid, 21.6 g of neopentyl glycol and 2.0 g of xylene were charged, the temperature was gradually raised from 100° C., and an esterification reaction was carried out at 250° C. for 4 hours. Then, 0.01 g of antimony trioxide was added as a catalyst, the pressure was reduced to 0.5 mmHg, and a condensation reaction was carried out at 280° C. for 3 hours to obtain 51.2 g of a polyester polymer (B-1).

The obtained polyester polymer (B-1) had Tg of 58° C. and Mn of 4,000. Further, from $^1$H-NMR and $^{13}$C-NMR, it was confirmed that the total number of an average of isophthalic acid units and an average of neopentyl glycol units per one molecule was 20. The hydroxy value was 30.0 mgKOH/g, and the acid value was 1.9 mgKOH/g. Further, the polyester polymer (B-1) had an ester group concentration of 35.63 mass % and an aromatic ring concentration of 29.07 mass %.

Example 5: Preparation of Polyester Polymer (B-2)

50.9 g of a polyester polymer (B-2) was obtained in the same manner as in Example 4, except that terephthalic acid was used instead of isophthalic acid.

The obtained polyester polymer (B-2) had Tg of 61° C. and Mn of 4,400. Further, from $^1$H-NMR and $^{13}$C-NMR, it was confirmed that the total number of an average of terephthalic acid units and an average of neopentyl glycol units per one molecule was 21. The hydroxy value was 31.0 mgKOH/g, and the acid value was 1.8 mgKOH/g. Further, the polyester polymer (B-2) had an ester group concentration of 35.84 mass % and an aromatic ring concentration of 29.24 mass %.

Example 6: Preparation of Polyester Polymer (B-3)

47.0 g of a polyester polymer (B-3) was obtained in the same manner as in Example 4, except that 27.9 g of adipic acid (not a $C_{8-15}$ aromatic polybasic carboxylic acid compound) was used, instead of 31.7 g of isophthalic acid.

The obtained polyester polymer (B-3) had Tg of 33° C. and Mn of 4,900. Further, from $^1$H-NMR and $^{13}$C-NMR, it was confirmed that the total number of an average of adipic acid units and an average of neopentyl glycol units per one molecule was 27. The hydroxy value was 30.2 mgKOH/g, and the acid value was 2.3 mgKOH/g. Further, the polyester polymer (B-3) had an ester group concentration of 38.81 mass % and an aromatic ring concentration of 0.0 mass %.

Example 7: Preparation of Polyester Polymer (B-4)

51.8 g of a polyester polymer (B-4) was obtained in the same manner as in Example 4, except that 32.9 g of 1,4-cyclohexanedicarboxylic acid (not a $C_{8-15}$ aromatic polybasic carboxylic acid compound) was used, instead of 31.7 of isophthalic acid.

The obtained polyester polymer (B-4) had Tg of 43° C. and Mn of 3,990. Further, from $^1$H-NMR and $^{13}$C-NMR, it was confirmed that the total number of an average of 1,4-cyclohexanedicarboxylic acid units and an average of neopentyl glycol units per one molecule was 22. The hydroxy value was 35.5 mgKOH/g, and the acid value was 2.1 mgKOH/g. Further, the polyester polymer (B-4) had an ester group concentration of 35.22 mass % and an aromatic ring concentration of 0.0 mass %.

Example 8: Preparation of Polyester Polymer (B-5)

Into a four-necked flask equipped with a thermometer, a reflux condenser and a stirrer, 95.8 g of phthalic acid anhydride, 13.6 g of ethylene glycol and 60.0 g of cyclohexane were charged, and the mixture was stirred until the mixture became uniform, while maintaining the temperature at 60° C. Then, the mixture was heated to 140° C., and the reaction was continued while maintaining the temperature. The reaction was terminated, when the reaction rate reached 98%. After the termination of the reaction, the solvent of cyclohexane was removed from a reaction product under reduced pressure to obtain a $C_{18}$ dicarboxylic acid derivative.

85.5 g of a polyester polymer (B-5) was obtained in the same manner as in Example 4, except that 68.4 g of the above $C_{18}$ dicarboxylic acid derivative was used, instead of 31.7 of isophthalic acid.

The obtained polyester polymer (B-5) had Tg of 68° C. and Mn of 3,990. Further, from $^1$H-NMR and $^{13}$C-NMR, it was confirmed that the total number of an average of the $C_{18}$ dicarboxylic acid derivative units and an average of neopentyl glycol units per one molecule was 16. The hydroxy value was 32.5 mgKOH/g, and the acid value was 2.0 mgKOH/g. Further, the polyester polymer (B-5) had an ester group concentration of 35.43 mass % and an aromatic ring concentration of 36.89 mass %.

Example 9: Preparation of Acrylic Resin (1)

Into a four-necked flask having a capacity of 500 ml and equipped with a thermometer, a reflux condenser, a stirrer and a dropping funnel, 75 g of xylene was charged and was headed to 80° C. while stirring. Then, at 80° C., a preliminarily uniformly mixed mixture (dropping component) containing 64 g of methyl acrylate, 36 g of acrylic acid, 5 g of peroxide-based polymerization initiator PERHEXYL O manufactured by NOF Corporation and 25 g of xylene, was dropwise added at the uniform rate from the dropping funnel over a period of 2 hours. After the termination of the dropwise addition, the mixture was maintained at 100° C. for 7 hours, and then the reaction was terminated. After the termination of the reaction, xylene as the solvent was removed from the reaction product under reduced pressure to obtain an acrylic resin (1) having carboxyl groups and a solid content of 99.5 mass %, Mw of 31,000, an acid value of 280.4 mgKOH/g and Tg of 36.8° C.

Examples 10 and 11: Preparation of Acrylic Resins (2) and (3)

Acrylic resins (2) and (3) having carboxyl groups were prepared in the same manner as in Example 9, except that the charged amounts were changed as shown in Table 1. Here, methyl methacrylate in Table 1 was uniformly mixed together with acrylic acid, etc.

acrylic resin within the temperature range of −25 to 200° C. at a rate of temperature rise of 10° C./min was measured, and Tg was obtained from an inflection point on the obtained chart by the middle point method.

Mw: While setting a flow rate of a carrier (THF) at 1.0 mL/min, a styrene converted molecular weight of an acrylic resin was obtained by using a 0.5% THF solution of the acrylic resin and a column TSKgelG4000XL manufactured by TOSOH CORPORATION).

[Each Component Used for Preparing Powder Coating Composition]

Curing agent (C1-1): Blocked isocyanate curing agent: Vestagon B1530 (tradename, manufactured by Degussa Japan Co., Ltd.)

Ultraviolet absorber (D-1): Tinuvin 326 (tradename, manufactured by BASF, molecular weight: 315.8, melting point: 139° C., volatilization temperature: 325.2° C.)

Ultraviolet absorber (D-2): Tinuvin 405 (tradename, manufactured by BASF, molecular weight: 583.8, melting point: 76.3° C., volatilization temperature: 348.5° C.)

Ultraviolet absorber (D-3): Tinuvin 928 (tradename, manufactured by BASF, molecular weight: 441.6, melting point: 113.5° C., volatilization temperature: 296.9° C.)

TABLE 1

| | Charged amount (g) | | | | | Evaluation | | | |
|---|---|---|---|---|---|---|---|---|---|
| Ex. | Methyl acrylate | Acrylic acid | Methyl methacrylate | PERHEXYL O | Product | Solid component concentration (mass %) | Mw | Acid value (mgKOH/g) | Tg (° C.) |
| 9 | 64 | 36 | 0 | 5 | Acrylic resins (1) | 99.5 | 31,000 | 280.4 | 36.8 |
| 10 | 84 | 16 | 0 | 5 | Acrylic resins (2) | 99.6 | 29,000 | 124.6 | 20.0 |
| 11 | 30 | 16 | 54 | 5 | Acrylic resins (3) | 99.6 | 28,000 | 127.2 | 69.7 |

Example 12: Preparation of Acrylic Resin (4)

Into a four-necked flask having an internal capacity of 1 L and equipped with a condenser tube and a thermometer, 200 ml of deionized water, 2 g of a reactive emulsifier JS2 of a succinic acid ester derivative (manufactured by Sanyo Chemical Industries, Ltd.) and 2 g of a polyoxyethylene nonylphenylether (EO10) were added, and when the temperature reached 80° C. in a warm bath under nitrogen stream, 10 ml of a 2 wt % ammonium persulfate aqueous solution was added. Then, 140.2 g of methyl methacrylate, 80.0 g of ethyl methacrylate and 0.2 g of n-lauryl mercaptane as a chain transfer agent were dropwised added over a period of 1 hour. Immediately after the dropwise addition, 1 ml of a 2 wt % ammonium persulfate aqueous solution was added to initiate a reaction. After 3 hours, the temperature in the bath was raised to 85° C. and maintained for 1 hour, and then the mixture was filtrated by a wire net having 300 meshes to obtain a blue-white aqueous dispersion. The obtained aqueous dispersion was freeze-solidified at −25° C. and dehydration-washed and then vacuum dried at 80° C. to obtain 209.2 g of a white powdery acrylic resin (4). The obtained acrylic resin (4) had Tg of 90° C. and Mw of 210,000.

Further, Tg and Mw of the acrylic resins were measured by the following methods.

Tg: By using a thermal analysis system (manufactured by Perkin Elmer Co., Ltd.), a heat balance of 10 mg of an Ultraviolet absorber (D-4): Hostavin PR-25 Gran (tradename, manufactured by Clariant, molecular weight: 250.0, melting point: 58.6° C., volatilization temperature: 213.8° C.)

Ultraviolet absorber (D-5): Tinuvin 900 (tradename, manufactured by BASF, molecular weight: 447.6, melting point: 113.5° C., volatilization temperature: 317.8° C.)

Further, the melting point and volatilization temperature of the ultraviolet absorber (D) were measured under the following measuring conditions.

Melting point: By using a thermal analysis system (manufactured by PerkinElmer), the heat balance of 10 mg of each ultraviolet absorber within the temperature range of from −25° C. to 200° C. at a rate of temperature rise of 10° C./min was measured, and a peak top was taken as the melting point.

Volatilization temperature: By using Tg/DTA 7200, manufactured by SII NanoTechnology Inc.), 10 mg of each ultraviolet absorber was heated from 30 to 500° C. at a rate of temperature rise of 10° C./min, and a temperature where 5% of the weight was reduced was taken as the volatilization temperature.

Pigment (E-1): Ti-Pure R960 (tradename, manufactured by DuPont, titanium oxide content: 89%)

Pigment (E-2): TIPAQUE PFC105 (tradename, manufactured by Ishihara Sangyo Kaisha, Ltd., titanium oxide content: 87%)

Pigment (E-3): D918 (tradename, manufactured by Sakai Chemical Industry Co., Ltd., titanium oxide content: 85%)

Pigment (E-4): TIPAQUE CR97 (tradename, manufactured by Ishihara Sangyo Kaisha, Ltd., titanium oxide content: 93%)

Pigment (E-5): TR-81 (tradename, manufactured by Huntsman Corporation, titanium oxide content: 93%)

Curing catalyst (F-1): Dibutyltin dilaurate

Curing catalyst (F-2): Tradename "NEOSTANN U-600H" (mixture of tris(2-ethylhexanoate) bismuth (95 mass %) and 2-ethylhexanoate (5 mass %)), manufactured by NITTO KASEI CO., LTD.

Hindered amine light stabilizer (G-1): Tinuvin 111FDL (tradename, manufactured by BASF)

Degasser (H-1): Benzoin

Surface adjuster (H-2): tradename: BYK-360P, manufactured by BYK Japan K.K.

Examples 14 to 34

(Preparation of Powder Coating Composition)

The total amount of components in their blending amounts (parts by mass) mentioned in Tables 2 and 3 were mixed by using a rapid mixer (manufactured by Youqi Ltd.) for about from 10 to 30 minutes to prepare a powder mixture. The mixture was subjected to melt-kneading by using a double-screw extruder (manufactured by Thermo prism, 16 mm extruder) at a barrel temperature of 120° C. to obtain pellets. The pellets were pulverized by using a pulverizer (manufactured by FRITSCH, tradename: Rotor Speed Mill P14) at room temperature, followed by classification by a 150 mesh to obtain a powder coating composition having an average particle size of about 40 μm.

The average particle size is a value measured by a laser diffraction type particle size distribution measuring machine (manufactured by Sympatec, tradename: Helos-Rodos) and obtained by a 50% average volume particle size distribution.

A cured film was formed by using the obtained powder coating composition, and each evaluation was carried out as described below.

Results are shown in Tables 2 and 3.

(Evaluation of Cured Film)

<Preparation of Test Specimen>

By using the powder coating composition, electrostatic coating was carried out on one side of an aluminum sheet treated with chromate by means of an electrostatic coater (manufactured by Onoda Cement Co., Ltd., tradename: GX3600C). It was kept for 20 minutes under an atmosphere of 200° C. and left for cooling to room temperature to obtain an aluminum plate provided with a cured film having a thickness of from 55 to 65 μm. By using the obtained aluminum plate provided with a cured film (1-1) as a test specimen, the following tests were carried out. Results are shown in Tables 2 and 3.

<Outer Appearance of Cured Film>

The state of a surface of the cured film was visually observed and evaluated by the following standards.

○ (good): The cured film was excellent in smoothness, and a repelled portion, a defect of coating, etc. were not observed.

x (bad): The cured film was poor in smoothness, and a repelled portion, a defect of coating, etc., were observed.

<The Separation Property of Cured Film>

The aluminum plate provided with the cured film (1-1) was cut, and the cross section of the cured film was observed by a scanning electron microscope.

The following are measuring conditions.

Apparatus: JSM-5900LV, manufactured by JEOL Ltd.

Acceleration voltage: 20 kV

Magnification: 10,000 times

Pretreatment for measuring: Platinum coating at 20 mA for 45 seconds by an autofine coater "JFC-1300", manufactured by JEOL Ltd.

Further, the separation property was evaluated by the following standards.

○ (good): An interface of a fluorinated resin layer and a polyester layer was observed.

x (bad): An interface of a fluorinated resin layer and a polyester layer was not observed.

<Boiling Water Resistance>

The aluminum plate provided with the cured film (1-1) was dipped in ion exchanged water (95±5° C.) for 24 hours, water-cooled and dried, and the adhesion of the cured film was evaluated by a method in accordance with JIS K5600-5-6 (cross cutting method). The cured film was evaluated by the following standards.

○ (good): Exfoliation of the cured film was not observed.

x (bad): Exfoliation of a fluorinated resin layer in the cured film was observed.

<Hydrochloric Acid Resistance>

10 Droplets of a 10% hydrochloric acid aqueous solution were left on the cured film, a watch glass was put over the cured film, and the cured film was left at rest for 1 week. The cured film was washed with ion exchanged water and dried, and the state of the cured film was visually observed and evaluated by the following standards.

○ (good): Swell, damage etc. of the cured film were not observed (the substrate was not eroded).

x (bad): Swell, damage etc. of the cured film were observed (the substrate was eroded).

<Alkali Resistance>

10 Droplets of a 10% sodium hydroxide aqueous solution were left on the cured film, a watch glass was put over the cured film, and the cured film was left at rest for 1 week. The cured film was washed with a ion exchanged water and dried, and the state of the cured film was visually observed and evaluated by the following standards.

○ (good): Swell, damage etc. of the cured film were not observed (the substrate was not eroded).

x (bad): Swell, damage etc. of the cured film were observed (the substrate was eroded).

<Moisture Resistance>

The aluminum plate provided with the cured film (1-1) was left at rest for 3,000 hours under a moisture resistance environment of 50° C. and 95 RH %, and the aluminum plate was washed with iron exchanged water, left to cool and dried. Then, the state of the cured film was visually observed and evaluated by the following standards.

○ (good): Swell and the change of color of the cured film were not observed.

x (bad): Swell and the change of color of the cured film were observed.

<Salt Water Spray Resistance>

The aluminum plate provided with the cured film (1-1) was left at rest for 3,000 hours under a 35° C. salt water spraying environment, and the aluminum plate was washed with iron exchanged water, left to cool and dried. Then, the state of the cured film was visually observed and evaluated by the following standards.
○ (good): Rust was not observed.
x (bad): Rust was observed.
<Sealing Adhesion>
A surface of an aluminum plate on which chromate treatment was carried out was subjected to electrostatic coating by using an electrostatic spray coater (tradename: GX3600C, manufactured by Onoda Cement Co.) and maintained in a 200° C. atmosphere in a gas heating furnace for 20 minutes. Then, the aluminum plate was left at rest to cool to room temperature to prepare an aluminum plate provided with a cured film (1-2) having a thickness of from 55 to 65 μm.

Pull-off adhesion tests of the aluminum plate (1-1) and the aluminum plate (1-2) were carried out by using "SH780" tradename, manufactured by Dow Corning Toray Co., Ltd. as a sealing agent, and they were evaluated.

Here, the pull-off adhesion tests were carried out under the following test conditions.

Apparatus: Pull-adhesion gauge, manufactured by Elcometer Limited.
Diameter of Dolly: 20 mm Further, the evaluation was carried out by the following standards.
○ (good): The dolly was peeled due to cohesion failure of the sealing agent.
x (bad): The dolly was peeled due to interfacial failure between the sealing agent and the substrate.
<Weather Resistance>
The aluminum plate provided with the cured film was set outside in Naha city, Okinawa. The gloss of the surface of the cured film just before the setting and after three years was measured by using PG-1 M (gloss meter, manufactured by NIPPON DENSHOKU INDUSTRIES CO., LTD.). As the value of the gloss just before the setting was 100%, the proportion of the value of the gloss after 3 years was calculated as a gloss retention rate (unit: %), and the weather resistance was evaluated by the following standards.

Here, the gloss retention rate was measured and calculated in accordance with JIS K5600-1-7.
○ (good): The gloss retention rate was at least 80%, and the color was not changed.
Δ (acceptable): The gloss retention rate was at least 60% and less than 80%, and the color was not changed.
x (bad): The gloss retention rate was less than 60%, and the color was changed to yellow.
<Acceleration Durability>
The time until the fluorinated resin layer was peeled (peeling time) was measured by using a xenon weather meter (manufactured by Suga Test Instruments Co., Ltd.). Here, usually water is sprayed, however, instead of spraying water, the test was carried out by using a 1% hydrogen peroxide water. The test conditions are as follows.
Relative humidity: 70% RH
Temperature: 50° C.
Light source: 80 W/m$^2$ (from 300 to 400 nm)
<Surface Smoothness of Cured Film>
The surface smoothness was evaluated by using standard plates for visually observing the smoothness by PCI (Powder Coating Institute). Ten standard plates of No. 1 to No. 10 were used. The higher the number is, the better the smoothness is.

TABLE 2

| | | | Example | | | | | | | | |
|---|---|---|---|---|---|---|---|---|---|---|---|
| | | | 14 | 15 | 16 | 17 | 18 | 19 | 20 | 21 | 22 |
| Used amount (g) | Fluorinated resin (A) | (A1-1) | 50.0 | 50.0 | 50.0 | 50.0 | 50.0 | 50.0 | — | 50.0 | 52.0 |
| | | (A-3) | — | — | — | — | — | — | 30.0 | — | — |
| | Polyester polymer (B) | (B-1) | 117.0 | — | — | — | — | 117.0 | 117.0 | — | — |
| | | (B-2) | — | 117.0 | — | — | — | — | — | 117.0 | — |
| | Polyester polymer | (B-3) | — | — | 117.0 | — | — | — | — | — | — |
| | | (B-4) | — | — | — | 117.0 | — | — | — | — | — |
| | | (B-5) | — | — | — | — | 117.0 | — | — | — | — |
| | Curing agent (C) | (C-1) | 29.0 | 29.0 | 29.0 | 29.0 | 29.0 | 29.0 | 20.3 | 29.0 | 13.0 |
| | Ultraviolet absorber (D) | (D-1) | 0.1 | 0.1 | 0.1 | 0.1 | 0.1 | — | 0.1 | 0.1 | — |
| | Pigment (E) | (E-1) | 105.0 | 105.0 | 105.0 | 105.0 | 105.0 | 105.0 | 73.5 | 105.0 | 35.0 |
| | Curing catalyst (F) | (F-1) | 0.0063 | 0.0063 | 0.0063 | 0.0063 | 0.0063 | 0.0063 | 0.0050 | — | 0.0050 |
| | | (F-2) | — | — | — | — | — | — | — | 0.0063 | — |
| | Another component (H) | Degasser (H-1) | 1.2 | 1.2 | 1.2 | 1.2 | 1.2 | 1.2 | 0.8 | 1.2 | 0.4 |
| | | Surface adjuster (H-2) | 3.0 | 3.0 | 3.0 | 3.0 | 3.0 | 3.0 | 2.1 | 3.0 | 1.1 |
| | | Acrylic resin (4) | — | — | — | — | — | — | — | — | — |
| Powder coating composition to be obtained | | | (1) | (2) | (3) | (4) | (5) | (6) | (7) | (8) | (9) |
| Outer appearance of cured film | | | ○ | ○ | ○ | ○ | ○ | ○ | ○ | ○ | Δ |
| Separation property of cured film | | | ○ | ○ | X | X | X | ○ | ○ | ○ | — |
| Boiling water resistance | | | ○ | ○ | X | X | X | ○ | ○ | ○ | ○ |
| Hydrochloric acid resistance | | | ○ | ○ | X | X | X | ○ | ○ | ○ | ○ |
| Alkali resistance | | | ○ | ○ | X | X | X | ○ | ○ | ○ | ○ |
| Moisture resistance | | | ○ | ○ | X | X | X | ○ | ○ | ○ | ○ |

TABLE 2-continued

|  | Example | | | | | | | | |
|---|---|---|---|---|---|---|---|---|---|
|  | 14 | 15 | 16 | 17 | 18 | 19 | 20 | 21 | 22 |
| Salt water-spray resistance | ◯ | ◯ | X | X | X | ◯ | ◯ | ◯ | ◯ |
| Sealing adhesion (Electric heating furnace) | ◯ | ◯ | X | X | X | — | ◯ | ◯ | ◯ |
| Sealing adhesion (Gas heating furnace) | ◯ | | X | X | X | — | ◯ | ◯ | ◯ |
| Weather resistance | ◯ | Δ | X | X | X | X (The gloss retention rate was at least 80%, but the color became yellow) | ◯ | Δ | X |

TABLE 3

| | | | Example | | | | | | | | | | | |
|---|---|---|---|---|---|---|---|---|---|---|---|---|---|---|
| | | | 23 | 24 | 25 | 26 | 27 | 28 | 29 | 30 | 31 | 32 | 33 | 34 |
| Used amount (Parts by mass) | Fluorinated resin (A) | (A1-1) | 16.7 | 15.7 | 15.7 | 16.7 | 16.7 | 16.7 | 16.7 | 16.7 | 16.7 | 16.7 | 16.7 | 16.7 |
| | Polyester polymer (B) | (B-1) | 38.9 | — | — | 38.9 | 38.9 | 38.9 | 38.9 | 38.9 | 38.9 | 38.9 | 38.9 | 38.9 |
| | | (B-2) | — | 36.7 | 36.7 | — | — | — | — | — | — | — | — | — |
| | Curing agent (C) | (C1-1) | 9.5 | 12.6 | 12.6 | 9.5 | 9.5 | 9.5 | 9.5 | 9.5 | 9.5 | 9.5 | 9.5 | 9.5 |
| | Ultraviolet absorber (D) | (D-1) | — | — | — | — | — | — | — | — | — | — | — | — |
| | | (D-2) | 4 | 4 | — | — | — | — | — | — | — | 4 | 4 | 4 |
| | | (D-3) | — | — | — | 4 | — | — | — | — | — | — | — | — |
| | | (D-4) | — | — | — | — | 4 | — | — | — | — | — | — | — |
| | | (D-5) | — | — | — | — | — | 4 | 4 | 4 | 4 | — | — | — |
| | Pigment (E) | (E-1) | 35 | 35 | 35 | 35 | 35 | — | — | — | — | 35 | 35 | 35 |
| | | (E-2) | — | — | — | — | — | 35 | — | — | — | — | — | — |
| | | (E-3) | — | — | — | — | — | — | 35 | — | — | — | — | — |
| | | (E-4) | — | — | — | — | — | — | — | 35 | — | — | — | — |
| | | (E-5) | — | — | — | — | — | — | — | — | 35 | — | — | — |
| | Curing catalyst (F) | (F-1) | 0.0063 | 0.0063 | 0.0063 | 0.0063 | 0.0063 | 0.0063 | 0.0063 | 0.0063 | 0.0063 | 0.0063 | 0.0063 | 0.0063 |
| | Hindered amine (G) | (G-1) | 2 | 2 | — | 2 | 2 | 2 | 2 | 2 | 2 | 2 | 2 | 2 |
| | Another component (H) | Degasser (H-1) | 0.4 | 0.4 | 0.4 | 0.4 | 0.4 | 0.4 | 0.4 | 0.4 | 0.4 | 0.4 | 0.4 | 0.4 |
| | | Surface adjuster (H-2) | 1.0 | 1.0 | 1.0 | 1.0 | 1.0 | 1.0 | 1.0 | 1.0 | 1.0 | 1.0 | 1.0 | 1.0 |
| | | Acrylic resin (1) | — | — | — | — | — | — | — | — | — | 2.0 | — | — |
| | | Acrylic resin (2) | — | — | — | — | — | — | — | — | — | — | 2.0 | — |
| | | Acrylic resin (3) | — | — | — | — | — | — | — | — | — | — | — | 2.0 |
| Powder coating composition to be obtained | | | (10) | (11) | (12) | (13) | (14) | (15) | (16) | (17) | (18) | (19) | (20) | (21) |
| Evaluation results | Weather resistance | | ◯ | ◯ | X | ◯ | Δ | ◯ | ◯ | Δ | Δ | ◯ | ◯ | ◯ |
| | Acceleration resistance (Peeling time (time)) | | 200 | 150 | 32 | 200 | 100 | 250 | 220 | 53 | 61 | 200 | 200 | 200 |
| | Surface smoothness of cured film | | 4 | 4 | 4 | 4 | 4 | 4 | 4 | 4 | 4 | 7 | 3 | 3 |

As shown in Table 2, in the case of the cured film produced by using the powder coating composition (1), (2), (7) or (8), the layer separation was observed such that a polyester layer was formed on a substrate side, and a fluorinated resin layer was formed on an air side, and the water resistance, chemical resistance and weather resistance were excellent.

In the case of the cured film produced by using one of the powder coating composition (3) to (5) and (9) containing no polyester polymer (B), the layer separation of the fluorinated resin layer and the polyester layer was not observed, and the water resistance, chemical resistance and weather resistance were insufficient.

In the case of the cured film produced by using the powder coating composition (6) containing no ultraviolet absorber (D), in the weather resistance test, the yellow color change was observed. It is considered that the yellow color change resulted due to decomposed products formed by the decomposition of the polyester layer.

As shown in Table 3 in Examples 23 to 27, in the case of the cured film produced by using the powder coating composition (10), (11) or (13) containing the ultraviolet absorber (D) and the hindered amine light stabilizer (G), in the accelerated weather resistance test, the time until the fluorinated resin layer was peeled was at least 100 hours, and the weather resistance was particularly excellent. On the other hand, in the case of the cured film produced by using the powder coating composition (12) containing no ultraviolet absorber (D) and no hindered amine light stabilizer (G), the weather resistance was insufficient. Further, it is considered that the weather resistance of the powder coating compositions (10) and (11) was superior to the powder coating composition (14), since the volatilization temperature of the ultraviolet absorber (D) used in the powder coating composition (14) was 213.8° C. which is relatively close to the firing temperature of 200° C., and thereby a part of the ultraviolet absorber (D) volatilized.

As shown in Table 3 in Examples 28 to 31, when a pigment (E) having a titanium oxide content of from 83 to 90 mass % was used, the weather resistance was excellent. On the other hand, if a pigment other than the pigment having a titanium oxide content of from 83 to 90 mass % was used, in the accelerated weather resistance test, the time until the fluorinated resin layer was peeled was from about 50 to 70 hours.

As shown in Table 3 in Examples 32 to 34, when an acrylic resin was used as another component (H), the surface flatness of the cured film was improved. Particularly, the powder coating composition (19) in which an acrylic resin (1) having an acid value of from 150 to 400 mgKOH/g was used, was excellent.

Examples 35 to 37

Chromate treated aluminum plates were respectively fluidized-bed coated with the powder coating compositions (1), (7) and (9) prepared in Examples 14, 20 and 22. That is, an aluminum plate was heated at 380° C. for 3 minutes, dipped for 6 seconds in a fluidized bath in which each powder coating composition was added and which was controlled at 35° C., and taken out. Then, the aluminum plate was heated at 200° C. for 2 minutes and cooled to room temperature. The obtained cured film had an average thickness of 300 μm.

The outer appearance of the cured film and the formation of pin holes were visually observed. Results are shown in Table 4. The evaluation of the outer appearance of the cured film was carried out in the same manner as in Example 14.

TABLE 4

| | Ex. | | |
|---|---|---|---|
| | 35 | 36 | 37 |
| Powder coating composition | (1) | (7) | (9) |
| Outer appearance of cored film | ○ | ○ | X |
| Formation of pinholes | Not formed | Not formed | Formed |

The cured film produced by the fluidized-bed coating with the powder coating composition (1) or (7) in which the polyester polymer (B) was contained, was excellent in outer appearance. Pin holes were observed on the cured film produced by using the powder coating composition (9) containing no polyester polymer (B).

INDUSTRIAL APPLICABILITY

According to the present invention, a powder coating composition is provided, whereby by single coating operation, in the process of melting and curing a powder coating composition, a fluorinated resin layer and a polyester layer are layer separated, and a cured film which is excellent in water resistance, chemical resistance and weather resistance can be formed. Thus, the powder coating composition can be used in applications such as outer coating of a wiper blade, a compressor unit of an air conditioner, a traffic light, a utility pole, a pole of a traffic sign, a roof of house, a small roof and a water heater, a back surface coating of a trans, an exterior of NAS cell, a backsheet of a solar cell and a heat collector for solar heat power generation, a body of an automobile, a bumper of an automobile and a blade for window power generation.

What is claimed is:

1. A powder coating composition comprising:
a single fluorinated resin (A);
a polyester polymer (B);
a curing agent (C); and
an ultraviolet absorber (D),
wherein the fluorinated resin (A) is a fluorinated polymer having a melting point of at most 200° C. or a fluorinated polymer having a glass transition temperature of from 40 to 150° C.,
wherein the fluorinated resin (A) does not comprise units derived from vinylidene fluoride,
wherein the polyester polymer (B) is a polyester polymer comprising units derived from a C8-15 aromatic polybasic carboxylic acid compound which comprises isophthalic acid and units derived from a C2-10 polyhydric alcohol compound,
wherein the curing agent (C) is selected from the group consisting of a blocked isocyanate curing agent, an amine curing agent, a β-hydroxyalkylamide curing agent, and a triglycidyl isocyanurate, and
wherein a cured film formed from the powder coating composition comprises a polyester polymer layer made from the polyester polymer (B) and a fluorinated resin layer made from the fluorinated resin (A) with the ultraviolet absorber (D) having a concentration in the fluorinated resin layer that is greater than a concentration in the polyester polymer layer.

2. The powder coating composition according to claim 1, wherein the fluorinated resin (A) is a hydroxyl group-containing fluorinated polymer (A1).

3. The powder coating composition according to claim 1, wherein the units derived from the aromatic polybasic carboxylic acid compound in the polyester polymer (B)

further comprise at least one selected from the group consisting of units derived from phthalic acid, units derived from terephthalic acid, units derived from naphthalenedicarboxylic acid, units derived from trimellitic acid and units derived from pyromellitic acid.

4. The powder coating composition according to claim 1, wherein the polyester polymer (B) contains from 30 to 60% of units derived from the aromatic polybasic carboxylic acid compound per the total units in the polyester polymer and has a number average molecular weight of from 500 to 5,000.

5. The powder coating composition according to claim 1, wherein the content ratio of the fluorinated resin (A) to the polyester polymer (B) is from 70/30 to 10/90 by mass ratio.

6. The powder coating composition according to claim 1, wherein the content of the curing agent (C) is from 10 to 100 parts by mass per 100 parts by mass in total of the fluorinated resin (A) and the polyester polymer (B).

7. The powder coating composition according to claim 1, further comprising a pigment (E).

8. The powder coating composition according to claim 1, further comprising a hindered amine light stabilizer (G) having a melting point of from 50 to 250° C.

9. A coated article comprising:
an article body; and
a cured film of the powder coating composition as defined in claim 1 provided on a surface of the article body,
wherein the cured film comprises a fluorinated resin layer made from the fluorinated resin (A) and a polyester polymer layer made from the polyester polymer (B), and
the ultraviolet absorber (D) has a concentration in the fluorinated resin layer that is greater than a concentration in the polyester polymer layer.

10. A process for producing a cured film, comprising:
coating a substrate with the powder coating composition as defined in claim 1 to form a coating film made of a melt of the powder coating composition on the substrate;
reacting reactive components in the powder coating composition; and then
cooling the coating film in the molten state to room temperature for solidification.

11. A coated article comprising: an article body; and a cured film produced by the process as defined in claim 10 on a surface of the article body.

12. The powder coating composition according to claim 1, wherein the curing agent (C) is a blocked isocyanate curing agent.

13. The powder coating composition according to claim 1, wherein the powder coating composition comprises only one type of curing agent (C).

14. The powder coating composition according to claim 1, wherein the cured film is formed by heating and melting at from 170 to 210° C. and then cooling.

15. A powder coating composition comprising:
a hydroxyl group-containing fluorinated polymer (A1);
a polyester polymer (B);
a blocked isocyanate curing agent (C1); and
an ultraviolet absorber (D1) which is selected from the group consisting of an inorganic ultraviolet absorber and an organic ultraviolet absorber,
wherein the organic ultraviolet absorber is non-oligomeric and has a molecular weight of from 200 to 1,000 and a melting point of from 50 to 150° C.,
wherein the hydroxyl group-containing fluorinated polymer (A1) has a melting point of at most 200° C. or a glass transition temperature of from 40 to 150° C.
wherein the polyester polymer (B) is a polyester polymer comprising units derived from a C8-15 aromatic polybasic carboxylic acid compound which comprises isophthalic acid and units derived from a C2-10 polyhydric alcohol compound, and
wherein a cured film formed from the powder coating composition comprises a polyester polymer layer made from the polyester polymer (B) and a fluorinated resin layer made from the hydroxyl group-containing fluorinated polymer (A1) with the ultraviolet absorber (D1) having a concentration in the fluorinated resin layer that is greater than a concentration in the polyester polymer layer.

16. A coated article comprising:
an article body; and
a cured film of the powder coating composition as defined in claim 15 provided on a surface of the article body,
wherein the cured film comprises a fluorinated resin layer made from the hydroxyl group-containing fluorinated polymer (A1) and a polyester polymer layer made from the polyester polymer (B), and
the ultraviolet absorber (D1) has a concentration in the fluorinated resin layer that is greater than a concentration in the polyester polymer layer.

17. The powder coating composition according to claim 15, wherein the powder coating composition comprises only one type of curing agent (C).

18. The powder coating composition according to claim 15, wherein the hydroxyl group-containing fluorinated polymer (A1) is the only fluorinated resin present, and
wherein the hydroxyl group-containing fluorinated polymer (A1) does not comprise units derived from vinylidene fluoride.

19. The powder coating composition according to claim 15, wherein the organic ultraviolet absorber has a molecular weight of from 200 to 629.8.

* * * * *